UNITED STATES PATENT OFFICE.

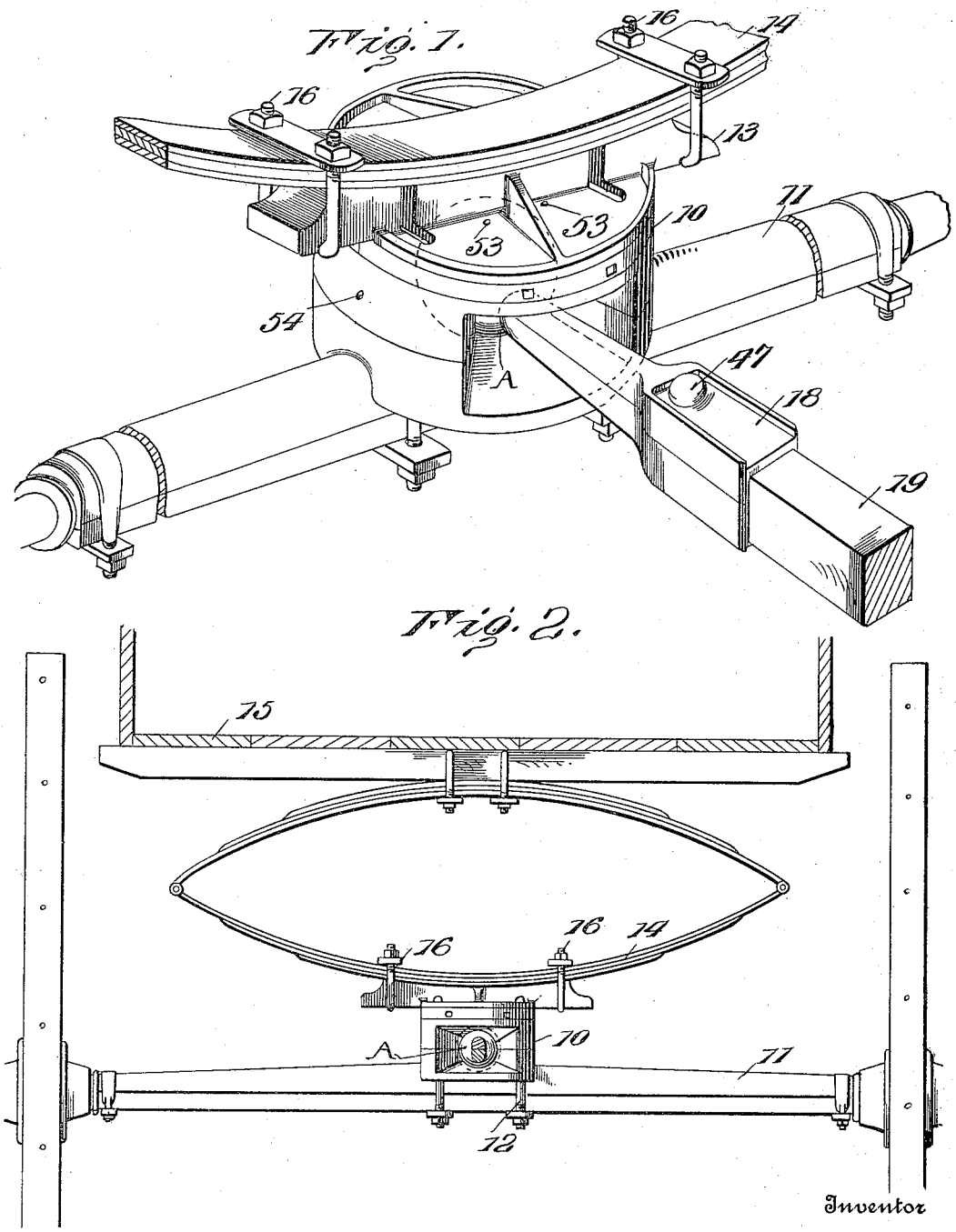

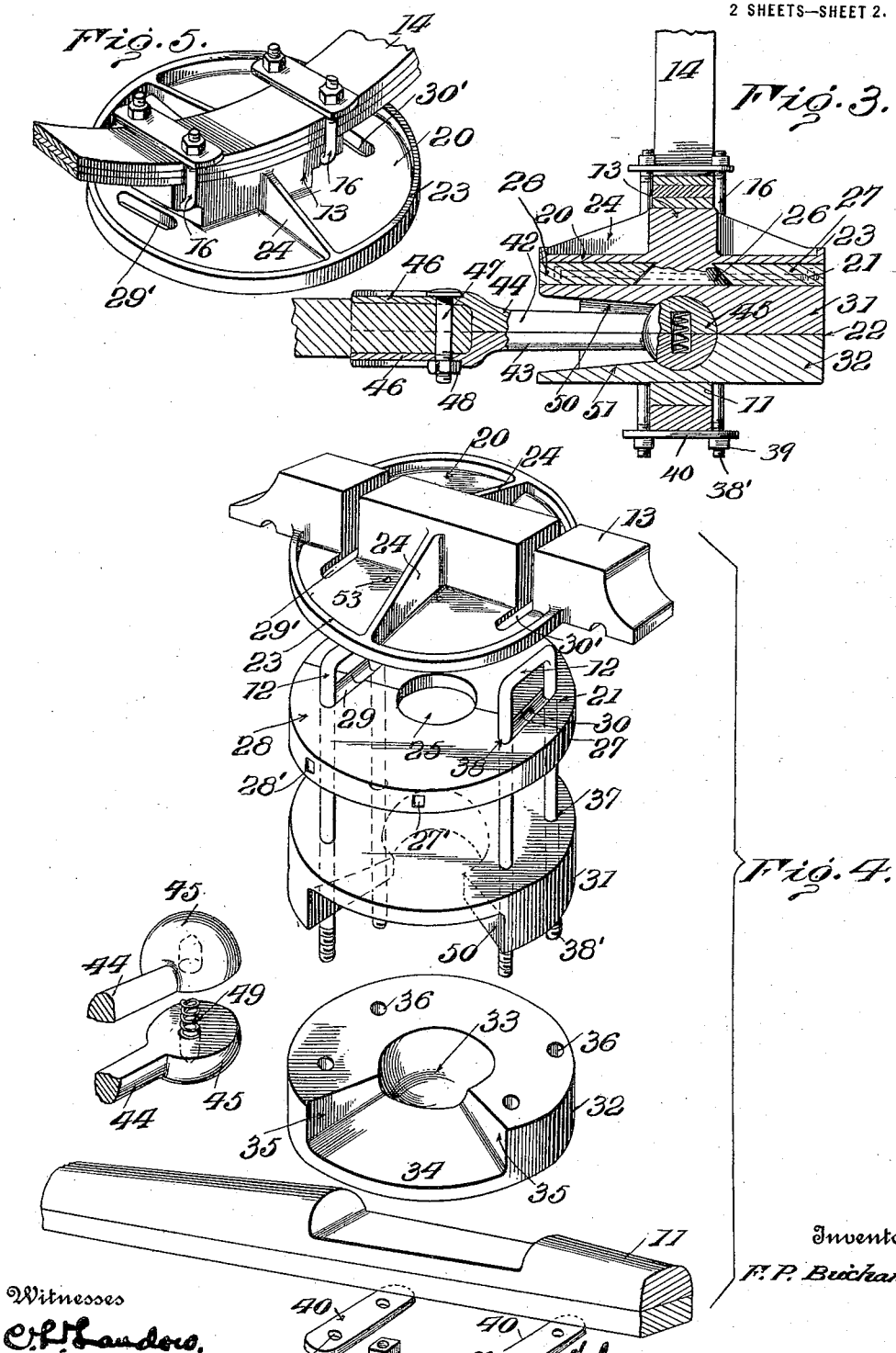

FRANK P. BUCHANAN, OF LAWRENCEBURG, TENNESSEE.

FIFTH-WHEEL.

1,146,235.  Specification of Letters Patent.  Patented July 13, 1915.

Application filed January 23, 1914. Serial No. 813,973.

*To all whom it may concern:*

Be it known that I, FRANK P. BUCHANAN, citizen of the United States, residing at Lawrenceburg, in the county of Lawrence and State of Tennessee, have invented certain new and useful Improvements in Fifth-Wheels, of which the following is a specification.

The present invention is directed to new and useful improvements in fifth wheels, and aims particularly to provide a device of this character which is constructed with such regard to proportion, number and arrangement of parts that it may be cheaply manufactured, will be durable and efficient in its action, and may be readily applied to any standard vehicle running gear.

The principal object of the present invention is to provide a fifth wheel so constructed that it will perform the twofold function of supporting the wagon body on the running gear and serving as the center of oscillation for the front axle of the running gear with respect to the reach pole, thus eliminating the necessity of employing a king-pin which, as well known, ordinarily constitutes the oscillatory center of the front axle.

A further object is the provision of a fifth wheel consisting essentially in upper and lower fifth wheel plates and a ball socket which is adapted to receive the ball terminal of a coupling member which is applied to the adjacent end of a reach pole for connecting the reach pole to the front axle.

The above and additional objects are accomplished by such means as are illustrated in the accompanying drawings, described in the following specification, and then more particularly pointed out in the claims which are appended hereto and form a part of this application.

With reference to the drawings, wherein there has been illustrated the preferred embodiment of this invention as it is reduced to practice, and throughout the several views of which similar reference characters designate corresponding parts, Figure 1 is a perspective view illustrating the fifth wheel of this invention properly assembled on the front axle of the vehicle running gear; Fig. 2 shows the fifth wheel applied to an ordinary spring wagon. This figure is a transverse section taken through the spring wagon between the front and rear wheels of the vehicle, looking in the direction of the front axle; Fig. 3 is a vertical longitudinal section taken medially through the device as shown in Fig. 1. Fig. 4 is a perspective view illustrating in detail the several elements which constitute the complete invention. In this figure the individual parts of the fifth wheel are shown in disassembled relation, but are arranged to indicate the manner in which they are adapted to be assembled to form an operative device; and Fig. 5 is a detail view of the upper fifth wheel plate and a modified form of attached bar.

Before proceeding to the description of the drawings, it is desirable to emphasize the fact that while the fifth wheel of the present invention has been designed with particular reference to the needs of farm wagons, has been illustrated, and will be hereinafter described, in that connection, it may, nevertheless, be applied with equal efficiency to any other form of vehicle running gear.

Proceeding now to the detailed description of the drawings, and referring particularly to Figs. 1 and 2, in which the fifth wheel of this invention is illustrated in its assembled relation to the running gear and body of an ordinary farm wagon, the numeral 10 designates the device as an entirety. It will be seen that the fifth wheel is mounted on the front axle 11 of the vehicle, and is secured thereto by U-bolts, indicated at 12. The upper portion of the fifth wheel is equipped with an attaching bar 13, which is designed to receive the spring 14 of the vehicle body 15, and is preferably secured thereto by means of U-bolts indicated at 16. A coupling member, designated as an entirety in Fig. 1 by the numeral 18, is applied to the adjacent terminal of the reach pole 19, in a manner to be hereinafter described, and serves to properly connect the reach pole to the front axle, eliminating the necessity of employing a king-pin for connecting the front axle and reach pole.

Reverting now to the description of the body portion of the fifth wheel, which has been heretofore designated as an entirety by the numeral 10, it will be seen upon reference to Fig. 3 that the member 10 consists essentially in an upper fifth wheel plate 20, a lower fifth wheel plate 21, a ball socket 22 and the attaching bar 13. The individual elements above named are clearly illustrated in detail in Fig. 4, and reference will, therefore, now be had particularly to this figure.

The members 20 and 21, which, as previously stated, constitute the upper and lower fifth wheel plates, are preferably formed in the nature of circular metallic plates. The member 20 is provided with an upwardly directed annular flange 23 and radially extending vertically disposed reinforcing webs or ribs 24. In the preferred embodiment of the invention, the members 20 and 13 are formed in a single casting. The member 13 is shown as solid but may be made hollow, so that the weight of the device will be reduced to a minimum without sacrificing strength. The member 21 is similar to the member 20 and is formed preferably of tempered steel so that the fifth wheel will be possessed of sufficient strength to withstand all the strains and shocks to which it will naturally be subjected during the passage of the vehicle over rough roads.

As will be hereinafter more fully explained, the lower fifth wheel plate 21 is adapted to be mounted on the front axle of the running gear in relatively fixed position with respect thereto, and it is, therefore, of course necessary to loosely connect the plates 20 and 21 so that they may rotate in opposite directions with respect to one another when the front wheels of the vehicle are moving out of alinement with the rear wheels, in the act of turning the wagon. For this purpose, therefore, an upwardly tapered opening 25 is formed centrally of the plate 21 and receives a frustoconical disk 26 formed on the lower face of the plate 20. It will be readily discerned upon reference to Fig. 3 that the member 26 is disposed in the central opening 25 of the plate 21, and that while the plate 20 may rotate on the plate 21, it will be held against upward movement therefrom by the engagement of the face of the member 26 with the wheel of the opening 25.

It now becomes obvious that it is necessary to form the plate 21 in two sections. These two sections, which are semi-circular in shape, will be hereinafter individually designated by the numerals 27 and 28. The reason for forming the plate 21 into the two sections 27 and 28 is, of course, to make possible the seating of the disk 26 in the opening 25. When the various parts of my fifth wheel are assembled for operation, the U-bolts 12 are applied in such manner that the two sections 27 and 28 will be held in the proper relation to one another.

Before taking up the description of the ball socket 22, it may be well to direct attention to the fact that the plate 21 is provided with a pair of elongated recesses 29 and 30. These recesses 29 and 30 extend in parallel relation to one another and are located at diametrically opposite points in the plate, being so arranged that their longitudinal center lines extend at right angles to radial lines connecting their central points with the center of the plate 21. These recesses or grooves 29 and 30 are of such depth that they will completely receive the bight portions of the U-bolts 12, thus making it possible for the lower face of the plate 20 to engage throughout its area with the upper face of the plate 21.

The ball socket, which has been heretofore designated as an entirety by the numeral 22 is formed from two relatively thick circular metallic plates 31 and 32. These members 31 and 32 are substantially identical in conformation, and it is deemed necessary, therefore, to describe only one of them in detail, the member 32 being chosen in this instance since it is more clearly illustrated than the member 31. The member 32, as will be seen upon reference to Fig. 4, is cored at its central portion to produce a semi-spherical recess or socket 33 and a segmental slot or opening 34. The vertical walls 35 of the segmental opening 34 are outwardly divergent, and act to limit the swinging movement of the front axle with respect to the reach pole, in a manner and for a purpose to be hereinafter fully described. It will be seen upon reference to either Fig. 3 or 4, that when the member 31 has been positioned on the member 32, the semi-spherical recesses of the two plates will mate, producing a substantially spherical ball socket. This socket is adapted to receive the ball terminal of the coupling member 18, indicated in Fig. 1 by the letter A.

Having thus described the preferred formation of the various parts of my fifth wheel, it may be well before taking up the description of the coupling member 18 to explain the manner in which the fifth wheel elements are assembled to constitute an operative device. The member 31 is first properly positioned on the member 32 to bring its semi-spherical recess in mating relation to the semi-spherical recess of the member 32 and to also superpose its segmental opening above the segmental opening 34. The sections 27 and 28 of the plate 21 are then applied to the lower face of the plate 20 so that the central opening 25 will inclose the disk member 26. After this, the plates 20 and 21 are mounted on the member 31 to bring the vertical bores 36, 37 and 38 of the members 32, 31 and 21, respectively into registering relation. Following these steps in the assembling of the device, the U-bolts 12 are inserted through these vertical bores, so that the members 21, 31 and 32 will be held in the proper assembled relation one upon the other, and the sections 27 and 28 will be held to incase the disk member 26.

Relative to the application of the bolt members 12 to the separate elements of the fifth wheel, it is to be noted that slots 29′ and 30′ are formed in the plate 20 and attaching bar 13, and are arranged to register with the recesses 29 and 30 of the plate 21, so that it will be possible to apply the bolts 12 to the sections 27 and 28 of the plate 21 after the sections have been properly assembled in the manner explained. In this connection, it is, of course, obvious that before the bolts can be properly applied, it will be necessary to bring the slots 29′ and 30′ into registration with the recesses 29 and 30. The lower terminals of the bolts 12 are threaded, as indicated at 38′, so that nuts 39 may be applied for holding the plates against withdrawal. At this point it may be well to explain that the arms of each bolt member 12 are disposed to engage against opposite faces of the front axle 11 so that the fifth wheel will be properly and securely positioned on the axle. Plates 40 having terminal apertures 41, which receive the terminals of the bolts 12, are applied to the under face of the axle 11, and are interposed between the nuts 39 and the axle for a purpose which will be obvious when reference is had to Fig. 1. As an additional means for holding the sections 27 and 28 of the plate 21 in the desired assembled relation, there have been provided a pair of connecting bolts 27′ and 28′ which, as will be observed upon reference to Fig. 4, extend through the two sections, being arranged in parallel relation to each other on opposite sides of the opening 25.

Reverting now to the description of the coupling member 18, and referring particularly to Fig. 3, in which this member is best illustrated, there has been provided in the preferred embodiment of this invention, a pair of mating castings 42 and 43. These members 42 and 43 are formed preferably from tempered steel, although, if so desired, a cheaper grade of material may be employed. The members 42 and 43 are substantially identical in construction, and it is deemed necessary, therefore, to describe only one of them in detail, the member 42 being chosen in this instance. This member consists in a body portion 44, one terminal of which is shaped to produce a semi-spherical head 45, and the other terminal of which is equipped with an integral casing or socket 46. The body portions 44 of the members 42 and 43, when in assembled relation, constitute a substantially cylindrical rod, as clearly shown in Fig. 1.

The casings or sockets 46 of the members 42 and 43 are adapted to mate to form a substantially rectangular socket which receives the terminal of the reach pole 19. A bolt, indicated at 47, is inserted through the members 46 and the inclosed portion of the reach pole for the obvious purpose of holding the pole against displacement. A nut 48 is, of course threaded onto the projecting lower terminal of the bolt. It is here to be noted that by making the members 42 and 43 divided in a fork, it will be possible to attach a double reach as well as a single reach. The semi-spherical heads 45 of the members 42 and 43 are also designed to mate so that they will form a ball head of such diameter that it may be seated within the ball socket formed by the recesses 33 of the socket plates 31 and 32. This ball head is in diameter approximately equal to the diameter of the said spherical recess so that, while it may freely move therein, it will be held against withdrawal once the plates are assembled. As shown in Fig. 4 particularly, a helical spring 49 is interposed between the members 45, and is held in the desired position by inserting its terminals in receiving bores formed in the contacting faces of the members 45. This spring member 49 operates, of course, to hold the curved faces of the members 45 in contact with the walls of the recesses 33, so that there will be no rattling in the passage of the vehicle over the road.

It will now be apparent, particularly upon reference to Fig. 1, that the provision of the socket plates 31 and 32 and the ball head A of the coupling member 18 make it possible to effectively connect the front axle 11 and the reach pole 19 without employing a kingpin. It will also be seen that, as heretofore explained, the vertical walls 35 of the segmental openings 34 act to limit the oscillation of the front axle with respect to the reach pole. It is desirable at this point to direct particular emphasis to this feature of the invention, for by pre-determining the arc through which the terminals of the axle may swing without permitting the engagement of the wheel rims with the wagon body, the vertical walls 35 may be spaced such distance that the axle will be held against further swinging movement when the wheels of the vehicle swing to approximately engage the sides of the wagon body. As is well known, the wheels of most wagons damage the wagon body considerably by cutting into the body when turns are made. This invention, however, eliminates entirely the possibility of damage to the wagon body by the wheel rims.

It will be seen upon reference to Fig. 4 that the upper and lower faces of the segmental opening 34, designated at 50 and 51, are outwardly divergent so that the body portion 44 of the coupling member may be allowed sufficient play. In order to permit the thorough lubrication of the contacting faces of the plates 20 and 21, oil holes, indicated at 53, have been formed in the plate 20 so that a lubricant may be applied to the fifth wheel plates without necessitating their disassemblage. Bores 54 are formed also in the socket plate 31 so that a lubricant may be introduced into the openings 33. The purpose of the flange 23 will now be fully understood, for it will be seen that this member facilitates the operation of applying the lubricant.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desired to emphasize the fact that various minor changes in details of construction, proportion and arrangement of parts may be resorted to, when required, without sacrificing any of the advantages of this invention, as defined in the appended claims.

One of the possible modifications to which the present invention may be subject is the casting of the ball member A as a solid unit instead of making it in two sections, as in the preferred embodiment. When the ball member is cast as a solid piece, it is, of course, necessary to make the members 42 and 43 in the same casting.

In Fig. 5 there is illustrated a still further modification of my invention. It will be noted upon reference to this figure that the attaching bar 13 differs from that form of the device shown in Fig. 4 in that its terminals are included within the limits of the plate 20. The purpose of thus forming the attaching bar is to make it possible to make the plate 20 of any desired size. It will be apparent in this connection that the attaching bar of the modified form shown in Fig. 5 will not interfere in any way with the extending of the attaching plate. It has been found in practice that the attaching bar must be made in one size, since it is impractical to space the retaining bolts 16 more than four inches from each other.

What is claimed is:—

1. A fifth wheel attachment for vehicle running gears including a pair of fifth wheel plates adapted to be respectively attached to the wagon body and to the front axle, a disk depending from the upper of said plates, the lower of said plates being provided with an opening receiving the said disk for operatively connecting the plates together, a ball socket fixed with respect to the lower of said fifth wheel plates, and a coupling member having a terminal ball seated in said ball socket.

2. A fifth wheel attachment for vehicle running gears including a pair of fifth wheel plates adapted to be respectively attached in relatively fixed position to the wagon body and front axle, the upper of said plates being provided with a substantially frusto-conical disk which depends from its lower face and from the central portion thereof, the lower of said plates being provided with a centrally located upwardly tapered opening which forms a seat for the said disk, a ball socket interposed between the lower of said plates and the vehicle axle and engaged by the lower terminal of the disk, and a coupling member having a terminal ball freely seated in the socket.

3. A fifth wheel attachment for vehicle running gears including a pair of fifth wheel plates, the upper of said plates being provided with an attaching bar adapted to be detachably secured to a wagon body, a substantially frusto-conical disk depending from the said upper plate, the lower of said plates being formed in two semi-circular sections, said lower plate being provided with a centrally located, upwardly tapered opening adapted to receive said disk, a ball socket consisting of upper and lower plates having ball receiving recesses formed in their abutting faces, and segmental slots leading from the recesses to their outer edges, U-bolts connecting the lower fifth wheel plate and socket plates and connecting the two sections of the lower fifth wheel plate to each other, and a coupling plate having a terminal ball interposed between the socket plates and seated in the ball receiving recesses thereof.

4. A fifth wheel attachment for vehicle running gears including a pair of fifth wheel plates, the upper of said plates being provided with an attaching bar adapted to be detachably secured to a wagon body, a substantially frusto-conical disk depending from the said upper plate, the lower of said plates being formed in two semi-circular sections, said lower plate being provided with a centrally located, upwardly tapered opening adapted to receive the said disk, a ball socket consisting of upper and lower plates having ball receiving recesses formed in their abutting faces, and segmental slots leading from the recesses to their outer edges, U-bolts connecting the lower fifth wheel plate and socket plates and the two sections of the lower fifth wheel plate to each other, and being adapted to connect the lower fifth wheel plate and ball socket to the front axle of the vehicle.

5. A fifth wheel attachment for vehicle running gears including upper and lower fifth wheel plates, means operativley connecting the said plates, a ball socket including mating members, means seating within the upper face of the lower fifth wheel plate and extending through said plate and through said members, said means connecting the members together and to the lower fifth wheel plate, and a coupling member having a terminal ball freely seated in said socket.

6. A fifth wheel attachment for vehicle running gears including upper and lower fifth wheel plates, the lower fifth wheel plate being formed of mating sections formed to receive a projection, a ball socket including mating members, a projection carried by the upper fifth wheel plate and embraced by the sections of the lower fifth wheel plate for connecting the plates together, means extending through the lower fifth wheel plate and through the members of the ball socket, said means connecting the sections of the lower fifth wheel plate for maintaining the said sections in engagement with said projection and operatively connecting the members of the ball socket to each other and to the lower fifth wheel plate, and a coupling member having a terminal ball freely seated in the socket.

In testimony whereof I affix my signature in presence of two witnesses.

FRANK P. BUCHANAN. [L. S.]

Witnesses:
G. P. ALFORD,
F. T. CANNON.

Copies of this patent may be obtained for five cents each, by addressing the "Commissioner of Patents, Washington, D. C."